United States Patent
Kuo

(12)
(10) Patent No.: US 6,325,447 B1
(45) Date of Patent: Dec. 4, 2001

(54) ELECTRIC LIFT CAMPER TOP

(76) Inventor: Ming C. Kuo, 19350 Christina Ct., Cerritos, CA (US) 90703

( * ) Notice: Subject to any disclaimer, the term of this patent is extended or adjusted under 35 U.S.C. 154(b) by 0 days.

(21) Appl. No.: 09/776,013

(22) Filed: Feb. 5, 2001

(51) Int. Cl.$^7$ .................................................... B60P 3/00
(52) U.S. Cl. ................. 296/165; 296/26.04; 296/26.05; 296/26.06; 296/160; 296/164; 296/165; 296/168; 296/172; 296/173; 296/175; 296/176; 296/99.1
(58) Field of Search ............................ 296/26.04, 26.05, 296/26.06, 160, 164, 165, 168, 173, 175, 99.1, 172, 176

(56) References Cited

U.S. PATENT DOCUMENTS

| | | |
|---|---|---|
| 3,712,573 * | 1/1973 | Pickles .................................. 248/394 |
| 3,802,732 * | 4/1974 | McKee .................................... 296/26 |
| 3,981,529 | 9/1976 | Bontrager . |
| 4,201,413 | 5/1980 | Rowe . |
| 4,362,258 | 12/1982 | French . |
| 4,630,627 | 12/1986 | Windows et al. . |
| 4,981,319 | 1/1991 | Gerzeny et al. . |
| 5,092,650 * | 3/1992 | Perlot ................................... 296/164 X |
| 6,126,220 * | 10/2000 | Brasher ................................ 296/26.04 |
| 6,152,517 * | 11/2000 | Steadman ........................... 296/26.04 X |

* cited by examiner

*Primary Examiner*—Stephen T. Gordon
*Assistant Examiner*—Lori L Coletta
(74) *Attorney, Agent, or Firm*—Gordon K. Anderson

(57) ABSTRACT

An electric lift camper top is provided for covering a rectangular head clearance opening (31) in a vehicle top structure for camper modification. The camper top consists of a bottom frame (32), including compression springs (38), attached to the vehicle surrounding the opening with a top frame (42) which is in turn attached to the compression springs urging the frames apart. A roof (54) is attached onto the top frame covering the opening in the vehicle. A flexible wall (58) is attached to both the top and bottom frame, securing them together forming a sealed enclosed area, when extended, to allow head room within the vehicle interior. Raising and lowering linkage means, employing front and rear connecting arms (78) and (80) are also jointly attached to the top and bottom frame. Electric drive means, in the form of an electric motor (82) and worm gear (84), are attached to the linkage such that the connecting arms are angularly separated raising or lowering the roof electrically using vehicle electric power.

17 Claims, 6 Drawing Sheets

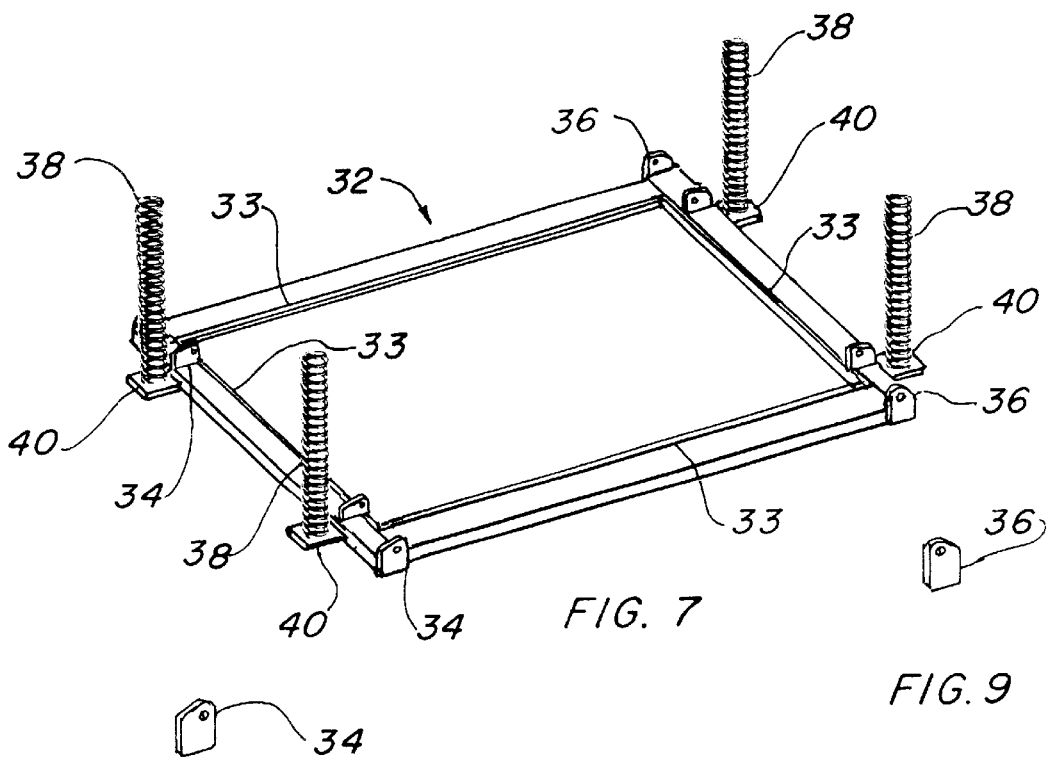
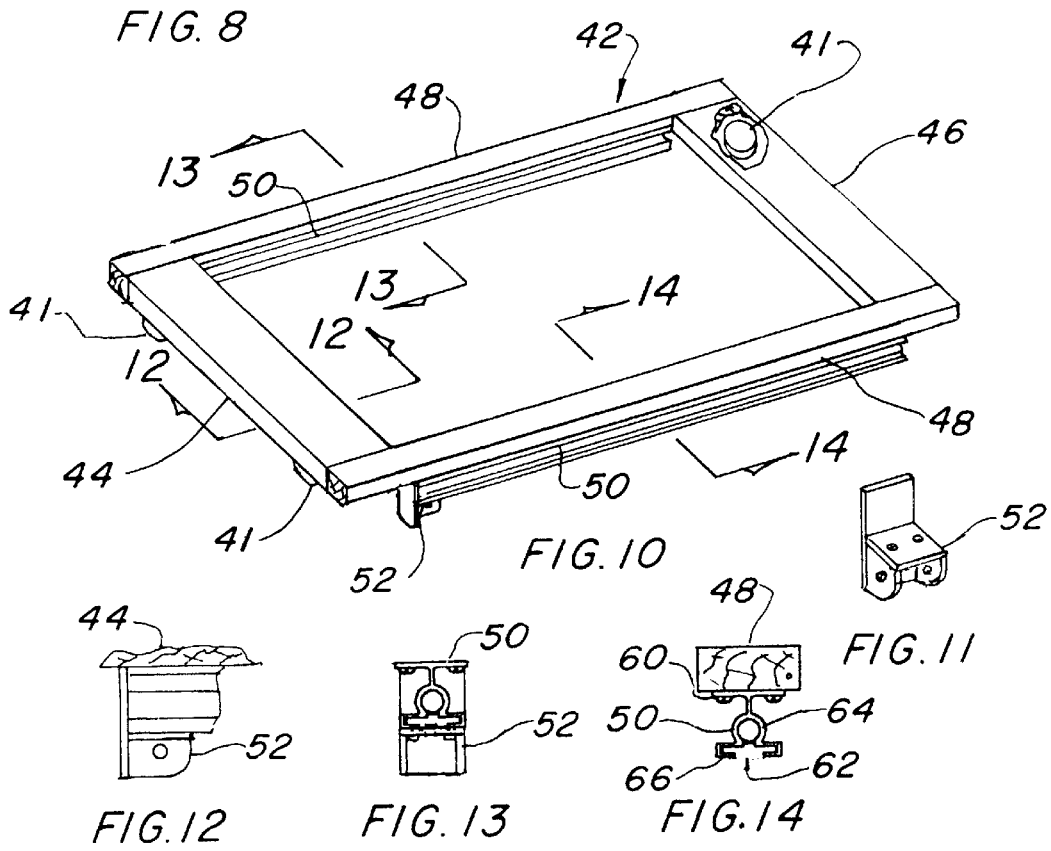

ELECTRIC LIFT CAMPER TOP

TECHNICAL FIELD

The present invention relates to mini-campers in general. More specifically to a top for a van that is raised or lowered by the use of the electrical system of the van itself.

BACKGROUND ART

Previously, many types of lifting systems have been used in endeavoring to provide an effective means to raise or lower a top on a van that has been converted or built by the original equipment manufacturer to function as a camper. This type of lifting operation has, in the past, been limited to hand cranks, spring loaded panels, opposed hinge struts lifted by hand or hydraulic systems added to the vehicle.

A search of the prior art did not disclose any patents that possess the novelty of the instant invention, however the following U.S. patents are considered related:

| Patent Number | Inventor | Issue Date |
| --- | --- | --- |
| 3,981,529 | Bontrager | Sep. 21, 1976 |
| 4,201,413 | Rowe | May 6, 1980 |
| 4,362,258 | French | Dec. 7, 1982 |
| 4,630,627 | Windows et al. | Dec. 23, 1986 |
| 4,981,319 | Gerzeny et al. | Jan. 1, 1991 |

Bontrager in U.S. Pat. No. 3,981,529 teaches a camper that has a wheeled body and a top that is shiftable between collapsed and elevated positions, relative to the body. A crank mechanism is used to raise and lower the top. In one direction of rotation the crank is interlocked to prevent opposite rotation when the top is raised. Reverse rotation of the crank releases a ratchet to permit lowering the top.

U.S. Pat. No. 4,201,413 issued to Rowe teaches a folding apparatus for expandable top camper bodies including lifting and supporting apparatus. Each panel has a bi-fold panel consisting or two foldable panel sections hinged to each other and to the lateral wall of the camper the hinges are spring loaded to self actuate and push the top up to its expanded position and retain its placement. Resilient side stays having pre-formed crimps induce folding and guide the flexible fabric siding of the camper during folding to prevent wrinkling.

French in U.S. Pat. No. 4,362,258 discloses an add-on roof assembly for use in converting a van into a camper. The invention is adapted to be installed as a unit and includes a mounting base for fitting snugly over the rim of the van top. A pop-up top nests with the base when in a lowered position. The top is of two-ply construction providing ventilation between the plies.

Windows et al. in U.S. Pat. No. 4,630,627 teaches a collapsible frame structure that has a upper frame section connected to a base frame section using hinged struts. Both the upper frame and the base frame have a pair of rigid frame members pivotally connected by opposed rigid frame members. The hinge members fold inwardly and collapse outward to expand the section. A pair of winches mount to the base and connect to the struts extending the struts to raise the frame. Stabilizing members are mounted to an upper portion of the struts to balance the weight of the upper section enabling the struts to extend easily.

U.S. Pat. No. 4,981,319 issued to Gerzeny et al. is for a hydraulic lifting system for use in raising and lowering a top covering an opening in a vehicle roof The system includes a number of lifting linkages that are slideably attached to the support structure such that at least pair of linkages are attached to opposing support structure and also each lifting linkage is pivotally attached to the top. A number of hydraulic cylinders are mounted on the structure and interface with each pair of lifting linkages. Actuation of the hydraulic device urges the shafts to move in a push-pull relationship with the lifting linkages raising and lowering the top. It will be noted that hydraulic systems are subject to leakage and if one of the cylinders bypasses only a small amount of fluid the roof will not be raised in unison and could cause catastrophic results.

DISCLOSURE OF THE INVENTION

Prior art has attempted to raise a roof on a camper conversion van in a number of ways, however, if it is achieved manually it requires a degree of physical strength and personal height to reach the mechanism without the help of a stool or some other means to extend ones reach. In an attempt to solve this problem of raising the roof easily many have used levers, cranks, winches and even hydraulics. While these techniques have proven somewhat successful in accomplishing this task they are all rather complicated and expensive.

It is therefore a primary object of the invention to utilize two pairs of lifting arms of equal length actuated by electrical motor driven worm gears using the on board electrical power. The motor driven worm gear is commonly used as a automobile seat adjuster and as such is small, compact and yet it has a high reduction ratio that produces considerable output torque for its size. The motor driven worm gear drives are mounted under the roof with two pairs of lifting arms that have their lower ends attached to the top of the vehicle. The lifting action of the arms is accomplished by thread engagement between the worm gear threaded shaft and carriers that are attached to the upper ends of the arms in the same manner as used in a conventional screw drive garage door opener. The upward force required to lift the roof varies with their angular positions due to mechanical leverages therefore the force is smaller when the roof is retracting and greater when it is elevating. In order to compensate for this disparity, compression springs are used that have compressive forces nearly equal to the roof weight when the roof is in the fully retracted position. This balance of forces permits reduced electrical power to start the motor and as the roof is elevated the springs compressive force decreases however simultaneously the mechanical leverage of the lifting arms increases allowing the motor to easily complete the lifting action. In order to minimize the electrical power requirements the springs are made as long as possible on their free lengths.

Since there is thread engagement between the carriers and the worm gear threaded shaft the lifting arms are self-locking creating a safety feature that prevents the roof from collapsing by its own weight if there is an inadvertent electrical power interruption. This feature eliminates the necessity of an external lock since, when the shaft is stationary, there is no way to rotate it without the use of the motor. As the attachment to raise or lower the roof uses a rack gear the locking mechanism is integrally formed within the mechanical linkage itself Bisecting struts are attached to the pair of front lifting arms to ensure that the lifting action will support the uneven load on the roof and maintain the roof level at any height. The length of the bisecting struts is exactly one half of the length of the arms. It should be emphasized that all of the components are mounted above the top of the vehicle without encroaching on any usable space.

An important object of the invention is that since the use of this particular motor driven worm gear, that has already been developed and in use by many vehicle manufactures, the economies of number make it very inexpensive relative to other gearmotors. Furthermore the ideal shape and capacity of motor may be selected from a large array of equipment developed by the various original equipment and aftermarket manufacturers.

Another object of the invention is that no major modification is required to the vehicle electrical system as only a single connection needs to be made into a power circuit and a conventional switch added for control. This type of addition is common and power is readily available in the accessory circuits of the conventional vans now in common use.

Still another object of the invention is that the control is extremely simple as it only involves a two position momentary electric switch commonly used for an automobile seat adjuster. The operator simply pushes and holds this momentary switch in the up position until the roof is raised and reverses the action to accomplish lowering. Since this type of control is common to positioning seats it is understood almost universally.

A further object of the invention is that the system is small, simple and unencumbered. As such the entire arrangement is economical to manufacture and within the reach of all.

A final object of the invention is that the frame on the top of the vehicle may easily have a detachable bed added to the structure when the roof is raised to its extended position adding further utility to the invention.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 7 is a partial isometric view of the bottom frame completely removed from the invention for clarity.

FIG. 8 is a partial isometric view of a front connecting arm bracket completely removed from the invention for clarity.

FIG. 9 is a partial isometric view of a rear connecting arm bracket completely removed from the invention for clarity.

FIG. 10 is a partial isometric view of the top frame completely removed from the invention for clarity.

FIG. 11 is a partial isometric view of a bisecting strut bracket completely removed from the invention for clarity.

FIG. 12 is a cross sectional view taken along lines 12—12 of FIG. 10.

FIG. 13 is a cross sectional view taken along lines 13—13 of FIG. 10.

FIG. 14 is a cross sectional view taken along lines 14—14 of FIG. 10.

BEST MODE FOR CARRYING OUT THE INVENTION

Figure 1:
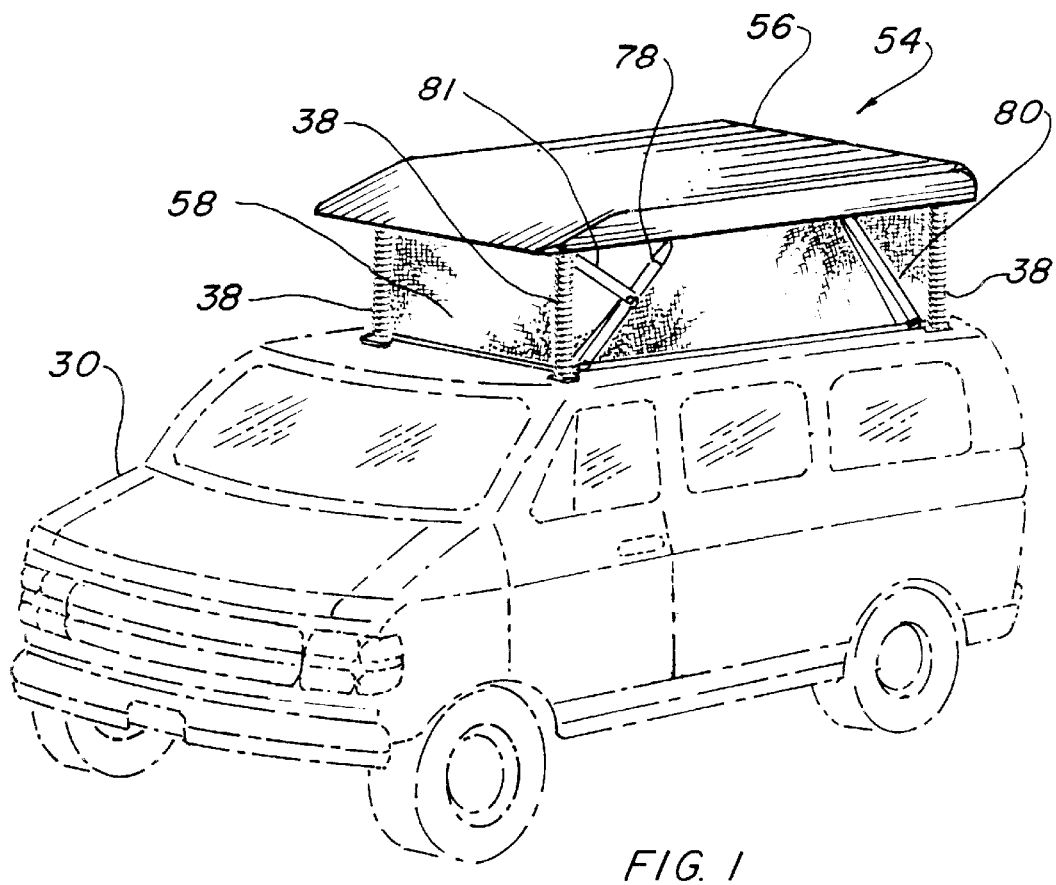
FIG. 1 is a partial isometric view of the preferred embodiment of the electric lift camper top installed on a van.
Figure 2:
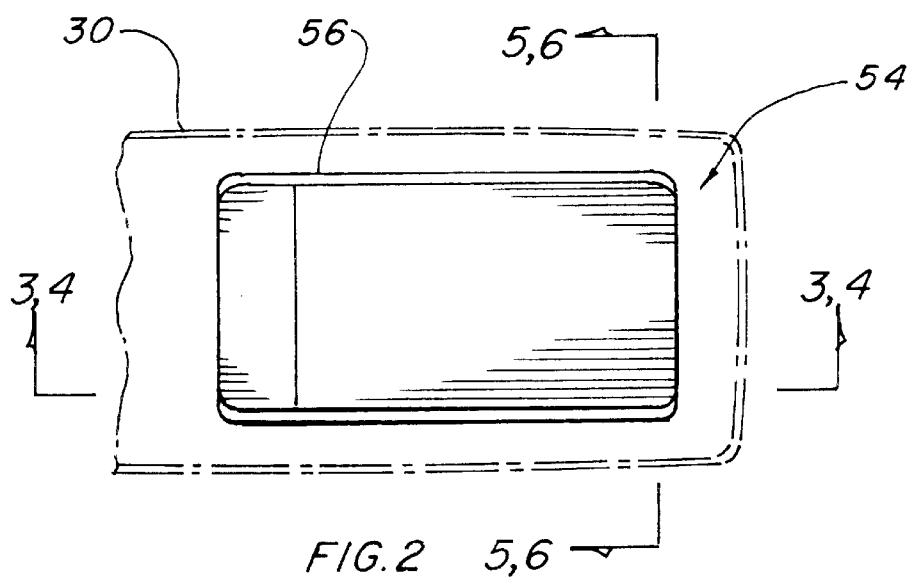
FIG. 2 is a partial plan view of the roof installed on the top of the van.

The best mode for carrying out the invention is presented in terms of a preferred embodiment. This preferred embodiment is shown in FIGS. 1 thorough 30 and consists of an electric lift camper top configured to cover a vehicle, in particular a van 30, which has been modified to include a rectangular head clearance opening 31 in its top structure.

A bottom frame 32 as shown in FIG. 7 is attached to the vehicle top structure surrounding the opening and is in a rectangular shape configured to fit adjacent to the opening in the vehicle structure. The frame 32 may be fabricated of thin wall square and/or rectangular tubing although structural shapes may also be used. Steel or aluminum material is preferred for this frame however even fiberglass or plastic may also be utilized. A batten board 33 of wood is attached to the inside surface of the frame 32 as illustrated for ease of connection of other elements. The bottom frame 32 also includes a pair of front connecting arm brackets 34 attached to the frame forward portion and a pair of rear connecting arm brackets 36 attached to the rear portion of the frame 32.

The brackets 34 and 36 are shown by themselves in FIGS. 8 and 9 respectively.

A plurality of compression springs 38 are attached to the bottom frame 32 and extend upwardly therefrom, as illustrated in FIG. 7, and have spring containing means in the form of flat platforms 40 with round raised bosses configured to captivate the bottom ends of the compression springs 38. The flat platforms 40 are positioned adjacent to the frame corners as illustrated.

A top frame 42, depicted by itself in FIG. 10, is attached to the compression springs 38 urging the frames apart. The top frame 42 consists of a front 44, back 46 and a pair of sides 48 with a hollow beam 50 disposed under each side 48. A pair of bisecting strut brackets 52, as shown in FIGURES II through 13, are attached under the top frame sides 48. Spring containing means in the form of a pair of spring mount bosses 41 similar to the bosses on the flat platforms 40 except inverted, are positioned under the top frame front 44 near the sides 48 and a pair of bosses 41 under the back 46 to captivate the upper ends of the compression springs 38, The top frame 42 is preferably constructed of wood however other materials may also be used that have similar characteristics. It should be noted that the hollow beam 50 is shown in cross section in FIG. 14 and its function will be discussed later.

Figure 15:
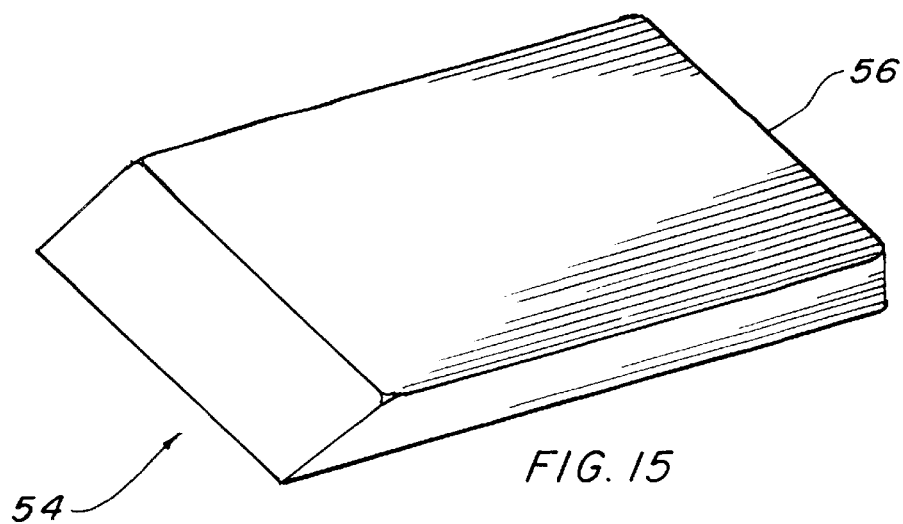
FIG. 15 is a partial isometric view of the roof completely removed from the invention for clarity.

A roof 54 is bonded directly onto the top frame 42 and is of sufficient size to cover the rectangular opening 31 in the top structure of the van 30. The roof 54 is shown by itself in FIG. 15 and consists of a fiberglass body 56 having wood reinforcement with a gel coat on its outside exterior to form a visibly smooth surface. Fiberglass construction is well known in the art and consists of chopped glass fibers mixed with a resin and a catalyst sprayed into a mold that has a gel coat on the mold surface and reinforcement positioned during the process. Other types of construction such as drawn metal or blown thermoplastic are also viable alternatives.

Figure 16:
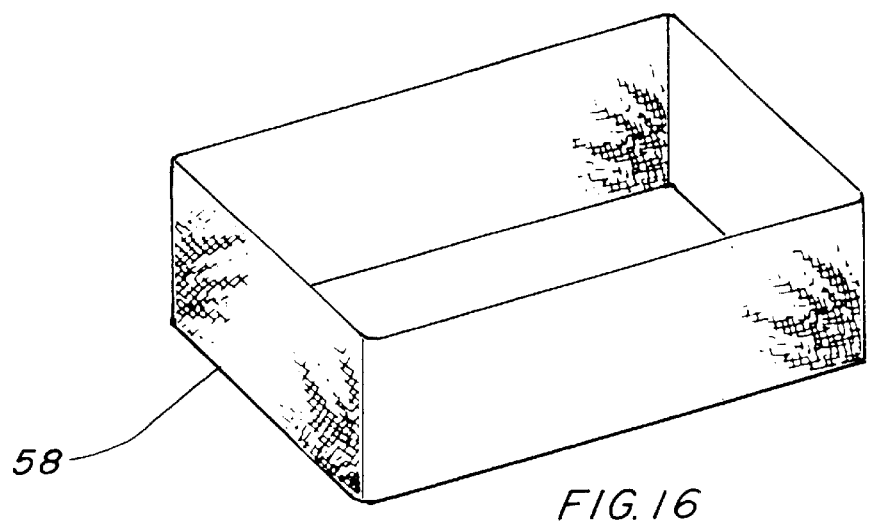
FIG. 16 is a partial isometric view of the flexible wall completely removed from the invention for clarity.

A flexible wall 58 is attached to both the top frame 42 and the bottom frame 32, as shown in FIGS. 1, 3–6 and by itself in FIG. 16, securing the frames together forming a sealed enclosed area which extends the vehicle top upward to allow head room within the vehicle interior. While the wall 58 is illustrated as being an opaque structure the wall may optionally include screened or transparent windows, with shades, for ventilation and to transmit light into the interior of the van. The flexible wall 58 is preferably water and mildew resistant also flame retardant. The preferred material for the flexible wall 58 is formed of a thermoplastic material selected from a group consisting of nylon, polypropylene, vinyl, polyester, poly-vinyl-chloride and woven cotton fabric impregnated with thermoplastic. While the above material is preferred any similar substance may be used in its place as long as it has similar characteristics and folds into place without cracking and does not permanently deform.

Raising and lowering linkage means are attached to both the top frame 42 and the bottom frame 32 such that the roof 54 may be elevated or retracted by the linkage. This is raising and lowering linkage consists of the following elements:

The top frame hollow beam 50, preferably in the form of an extrusion member that includes a uppermost end and a lower end, with the uppermost end having a horizontal flange 60 and the lower end having an open hollow portion 62 with the hollow portion 62 including a round center 64 with opposed horizontal grooves 66 therein.

Figure 17:
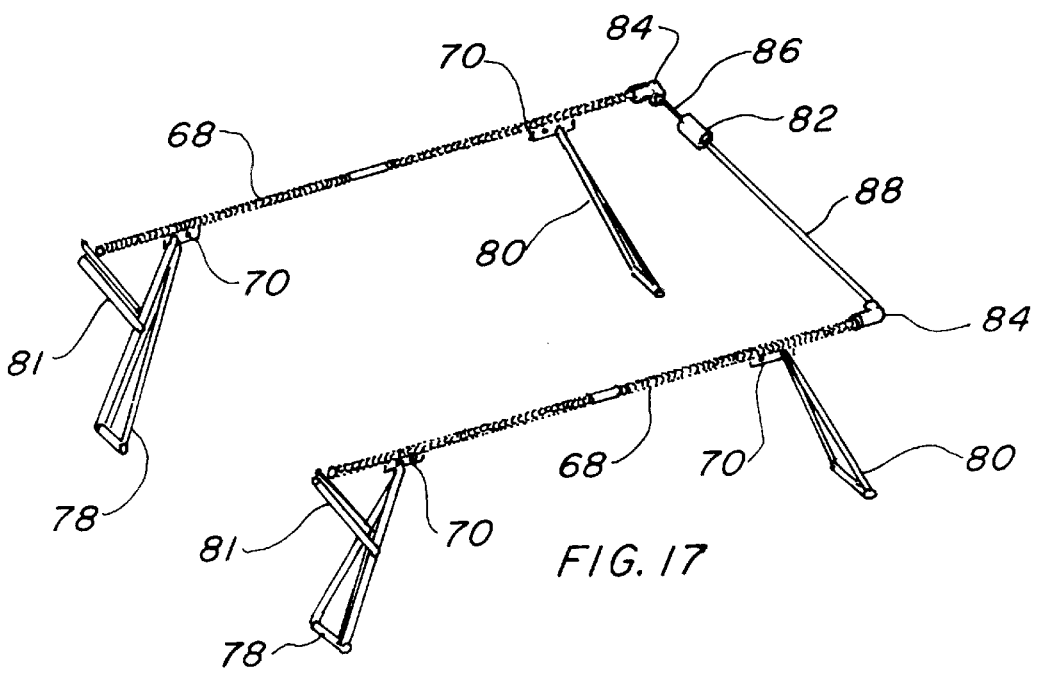
FIG. 17 is a partial isometric view of the raising and lowering means along with the electric drive means shown separately from the invention for clarity.

A shaft 68, is inserted into each top frame beam extrusion member round center 64 and is free to rotate within the center. Each shaft 68 preferably has square, or so called ACME threads thereon, with right hand threads on a first half and left hand threads on a second half as shown in FIG. 17.

Figure 18:
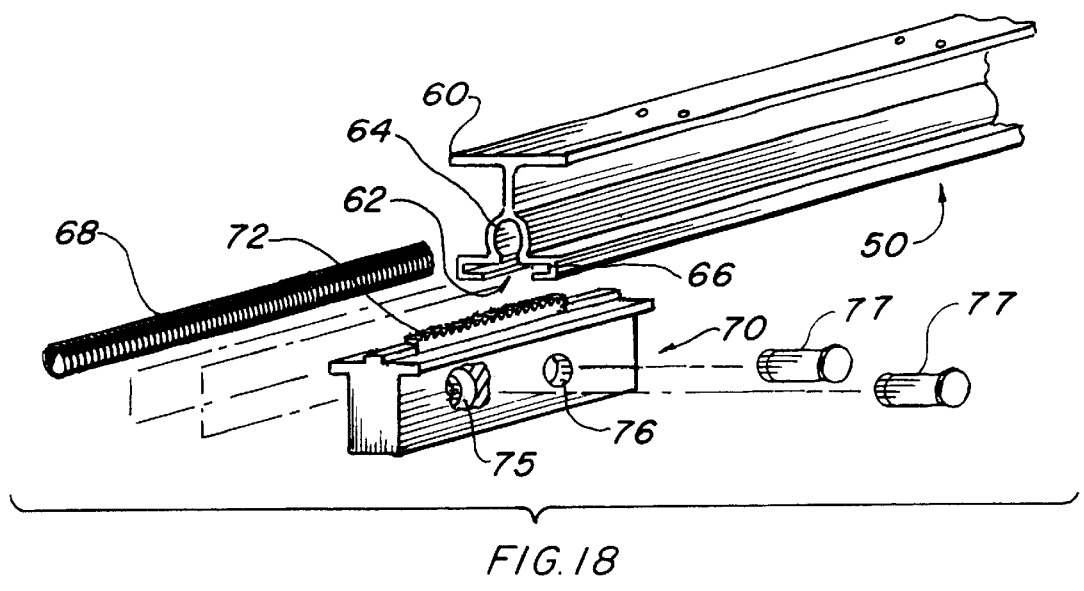
FIG. 18 is an exploded view of the top frame beam, shaft and rack gear carrier and their interrelationship.
Figure 19:
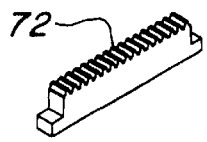
FIG. 19 is a partial isometric view of the rack gear completely removed from the invention for clarity.
Figures 20, 21:
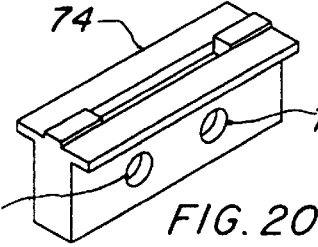
FIG. 20 is a partial isometric view of the rack gear body completely removed from the invention for clarity.
FIG. 21 is a partial isometric view of the rack gear spacer completely removed from the invention for clarity.
Figure 22:
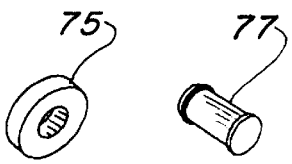
FIG. 22 is a partial isometric view of the rack gear pin completely removed from the invention for clarity.
Figure 23:
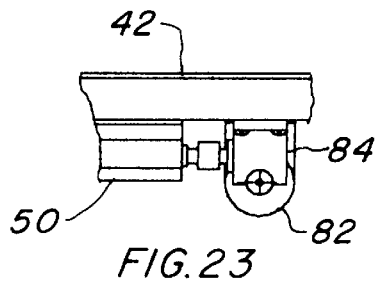
FIG. 23 is a fragmentary side view of side
Figure 24:
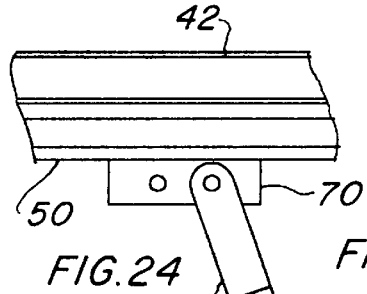
FIG. 24 is a fragmentary side elevation view of the attachment between the rack gear and the shaft.
Figure 25:
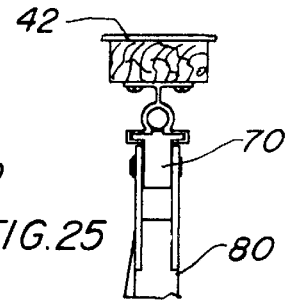
FIG. 25 is a fragmentary side cross sectional view of the attachment rear connecting arm to the rack gear carrier, looking forward from the curb side.

A pair of rack gear carriers 70 are slideably disposed within the open hollow portion 62 of each frame beam 50 as illustrated in FIG. 18. Each carrier 70 is made up of a rack gear 72 and a rack gear body 74 with the rack gear 72 interfacing with each shaft 68 and the upper flanges of the body 74 disposed within the horizontal grooves 66 of the beam hollow portion 62. The rack gear 72 is inserted into the body and held in place by two rod gear spacers 75, as illustrated in FIG. 18. The rack gear body 74, as depicted by itself in FIG. 20, further includes arm attaching means in the form of a hole 76 therethrough, as illustrated, with a rack gear pin 77 penetrating the arm, body 74 and spacer 75. The hole 76 nearest the front or back is used to apply the thrust load evenly on the rack gear 72.

Figures 26, 27:
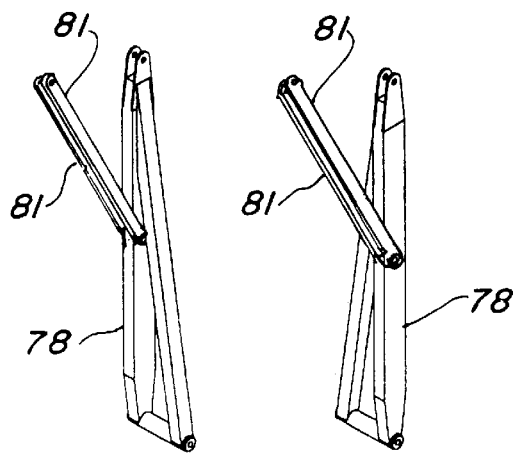
FIG. 26 is a rear view of the curb side front connecting arm including bisecting struts, completely removed from the invention for clarity.
FIG. 27 is a rear view of the road side front connecting arm including bisecting struts, completely removed from the invention for clarity.

A pair of front connecting arms 78 are arcuately connected to each rack gear carrier arm attaching means hole 76 using the pin 77. The arms 78 include a pair of bisecting struts 81 that are each attached on a first end to the front connecting arms 78 and on a second end to the strut brackets 52 on the underside of the top frame 42. The bottom of each connecting arm 78 is attached to the front connecting arm bracket 34 as illustrated best in FIGS. 3 and 4. The connecting arms 78 are shown by themselves in FIGS. 26 and 27 with the struts 81 attached. The arms 78 are identical in configuration and may be reversed to accommodate each opposite side except the bisecting struts are angled in mirror image. It should be noted that the length of the bisecting struts 81 are exactly one half of the length of the front connecting arms 78 and their rearward ends connect to an equidistant bisecting point within each arm 78, as shown in FIGS. 26 and 27. The forward end of each bisecting strut 81 connect to a strut bracket 52. The connecting hole on the strut bracket 52, where the upper end of the front connecting arm 78 is pivotally attached, must be at the same horizontal elevation as the hole 76 in the rack gear carrier 70. This geometrical relationship ensures that the roof maintains a horizontal level at any height.

Figure 3:
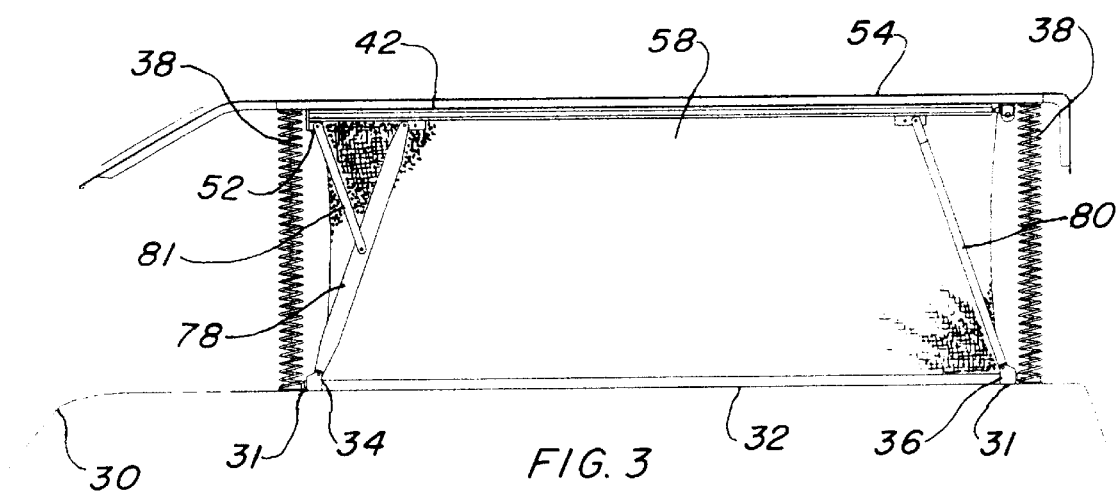
FIG. 3 is cross sectional view taken along lines 3—3 of FIG. 2 showing the roof in the raised position.
Figure 4:
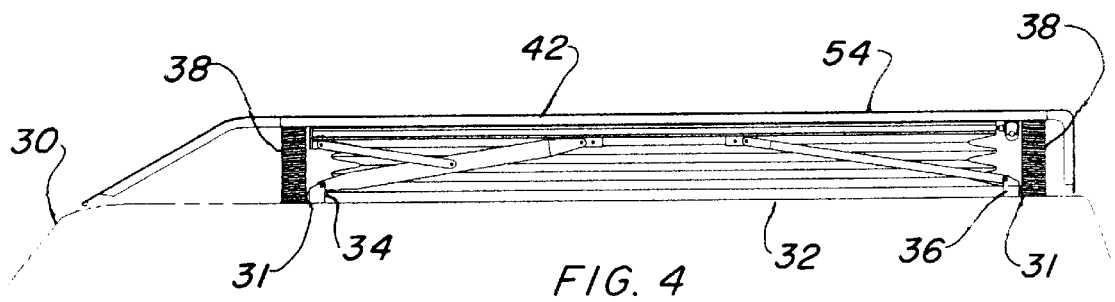
FIG. 4 is cross sectional view taken along lines 4—4 of FIG. 2 showing the roof in the retracted position.
Figure 5:
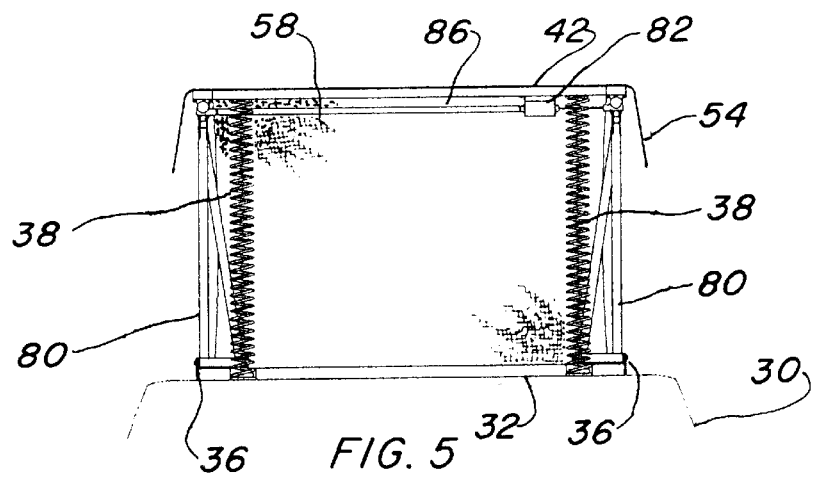
FIG. 5 is cross sectional view taken along lines 5—5 of FIG. 2 showing the roof in the raised position.
Figure 6:
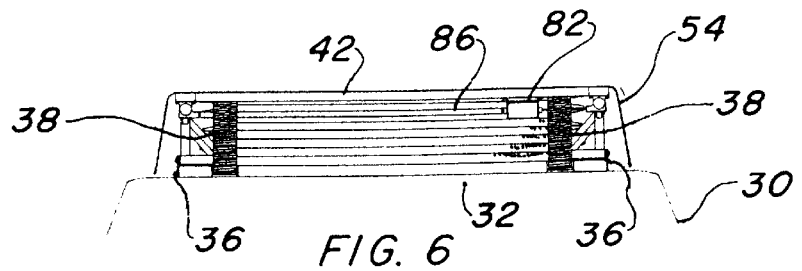
FIG. 6 is cross sectional view taken along lines 6—6 of FIG. 2 showing the roof in the retracted position.
Figure 28:
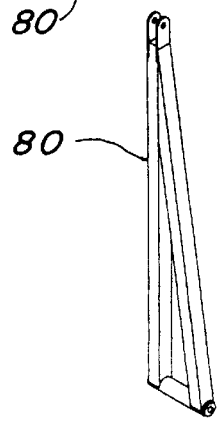
FIG. 28 is a side view of the curb side rear connecting arm, completely removed from the invention for clarity.
Figure 29:
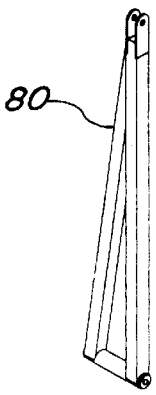
FIG. 29 is a side view of the road side rear connecting arm, completely removed from the invention for clarity.
Figure 30:
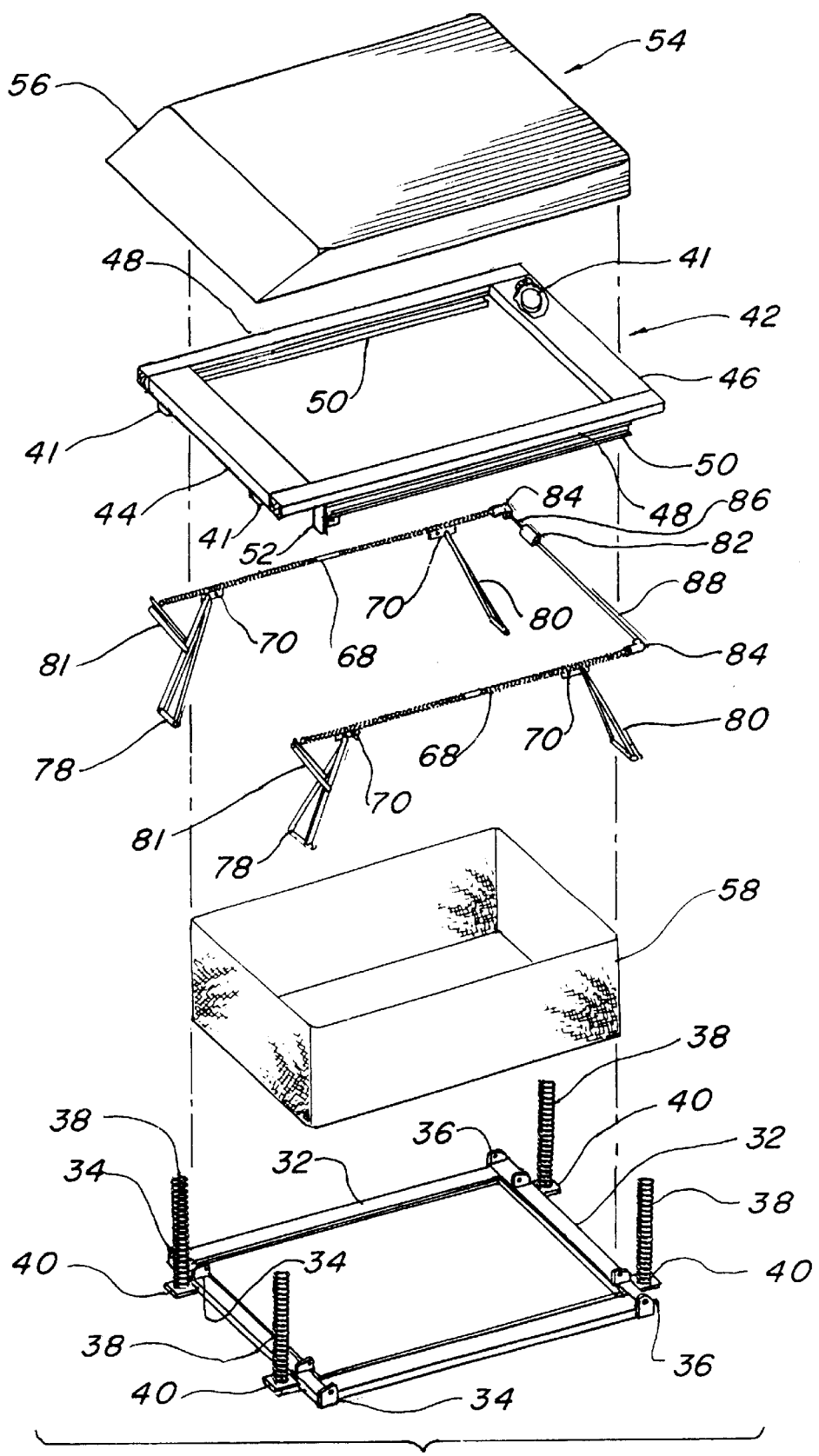
FIG. 30 is an exploded view of the preferred embodiment of the invention.

A pair of rear connecting arms 80 are arcuately connected to each rack gear carrier arm attaching means hole 76 using the pin 77 as shown in FIGS. 3 and 4. The rear connecting arms 80 are triangular in shape as illustrated in FIGS. 28 and 29 and arcuately fit inside each rear connecting arm bracket 36. The arms 80 are identical in configuration and may be reversed to accommodate each opposite side as shown. The rear connecting arms 80 are equal in length to the front connecting arms 78 to assure smooth parallel lifting of the roof 54 and to eliminate any binding.

Electric drive means are attached to the raising and lowering linkage means to permit the roof 54 to be raised or lowered electrically using vehicle electric power. The electric drive means consist of a double end drive electric motor 82 connected to a worm gear 84 attached to each shaft 68 as depicted in FIG. 17. The drive means motor 82 rotates each shaft 68 which in turn linearly displaces the rack gear carriers 70 along with their attached connecting arms 78 and 80 thereby electrically raising or lowering the roof 54. The worm gear 84 simply permits just one motor 82 to be used and changes the direction of rotation at 90 degree right angles which is ideal as it moves both sides of the top frame 42 simultaneously. The motor 82 is connected to the curb side worm gear 84 with a flexible shaft 86 and to the road side with a rigid tubular shaft 88 as shown to assure proper alignment. It will be noted that the preferred type of electric motor 82 is a passenger vehicle seat adjuster motor that operates on the conventional 12 volt direct current vehicle electrical power. It should be noted that two or more of these motors 82 may also be used in tandem for special circumstances where the roof 54 is particularly large or heavy.

In operation the motorist simply slides the switch attached to the motor 82 in the direction of travel, up or down, which rotates the flexible shaft 86, rigid tubular shaft 88, worm gears 84 and shafts 68 on each side. As the threaded shafts 68 have different directional threads on each side the rack gear carriers 70 are linearly advanced or retracted which through the linkage of the connecting arms 78 and 80 lift or lower the roof 54 as desired. When the movement is completed the roof 54 is locked in place with the linkage because of the self-locking feature which is the engagement between the threaded shaft 68 and the rack gear 72. It will be further noted that the switch is not shown as its structure and attachment to the electrical system of the vehicle is extremely well known and commonly used in the art.

While the invention has been described in complete detail and pictorially shown in the accompanying drawings, it is not to be limited to such details, since many changes and modifications may be made to the invention without departing from the spirit and scope thereof hence, it is described to cover any and all modifications and forms which may come within the language and scope of the appended claims.

What is claimed is:

1. An electric lift camper top configured to cover a vehicle having a rectangular head clearance opening in its top structure comprising:
    a bottom frame attached to a vehicle top structure surrounding the opening,
    a plurality of compression springs attached to the bottom frame extending upwardly therefrom,
    a top frame attached to the compression springs urging the top and bottom frames apart, said top frame having a front, back and a pair of sides with a hollow beam disposed under each side,
    a roof attached directly onto the top frame, said roof having sufficient size to cover the rectangular opening in the vehicle top structure,
    a flexible wall attached to both the top frame and the bottom frame securing the frames together forming a sealed enclosed area, thus extending the vehicle top upward to allow head room within a vehicle interior,
    raising and lowering linkage means attached to both the top frame and the bottom frame such that the roof may be elevated or retracted by the raising and lowering linkage means, and
    electric drive means attached to the raising and lowering linkage means such that the roof may be raised or lowered electrically using vehicle electric power.

2. The electric lift camper top as recited in claim 1 wherein said bottom frame further having a rectangular shape configured to fit around said opening in the vehicle top structure.

3. The electric lift camper top as recited in claim 2 wherein said bottom frame further comprising a pair of front connecting arm brackets attached to a forward portion of the bottom frame and a pair of rear connecting arm brackets attached to a rear portion of the bottom frame, also said bottom frame having spring containing means to captivate a bottom end of said compression springs.

4. The electric lift camper top as recited in claim 3 wherein said spring containing means are positioned adjacent to corners of the bottom frame.

5. The electric lift camper top as recited in claim 1 wherein said top frame further comprises a pair of bisecting strut brackets attached under the front of the top frame and spring containing means on the front and back of the top frame to captivate upper ends of said compression springs.

6. The electric lift camper top as recited in claim 1 wherein said roof comprises a fiberglass body with a gel coat on its outside exterior to form a visibly smooth surface.

7. The electric lift camper top as recited in claim 1 wherein said flexible wall is water and mildew resistant also flame retardant.

8. The electric lift camper top as recited in claim 1 wherein said flexible wall is formed of a thermoplastic material selected from a group consisting of nylon, polypropylene, vinyl, polyester, poly-vinyl-chloride and woven cotton fabric impregnated with thermoplastic.

9. The electric lift camper top as recited in claim 1 wherein said raising and lowering linkage means further comprises:
    said top frame further comprising an extrusion member having a uppermost end and a lower end with the uppermost end including a horizontal flange and said lower end having an open hollow portion with the open hollow portion having a round center and opposed horizontal grooves therein,
    a shaft, having ACME threads thereon with right hand threads on a first half and left hand threads on a second half with the shaft inserted into each top frame beam extrusion member round center in a rotatable manner,
    a pair of rack gear carriers slideably disposed within the open hollow portion of each frame beam with each rack gear carrier having, a rack gear and a pair of opposed angular sides with the rack gear carrier interfacing with each shaft and the angular sides of the carrier disposed within the horizontal grooves of a open hollow portion of each frame beam, the angular sides further having arm attaching means therethrough,
    a pair of front connecting arms arcuately connected to each rack gear carrier arm attaching means, and
    a pair of rear connecting arms arcuately connected to each rack gear carrier arm attaching means, with said rear connecting arms equal in length to the front connecting arms.

10. The electric lift camper top as recited in claim 9 wherein said front connecting arms further comprise at least one bisecting strut attached on a first end to each front connecting arm at a equidistant bisecting point and on a second end to the top frame, said bisecting arm strut is of a length equal to one half of the front connecting arm.

11. The electric lift camper top as recited in claim 1 wherein said electric drive means further comprise a double end drive electric motor connected to a worm gear attached to each shaft, for rotating the shaft linearly displacing the rack gear carriers and their attached connecting arms for electrically raising or lowering the roof.

12. The electric lift camper top as recited in claim 11 wherein said electric motor is a passenger vehicle seat adjuster motor operating on vehicle electrical power.

13. An electric lift camper top configured to cover a vehicle having a rectangular head clearance opening in its top structure comprising:
    a bottom frame attached to a vehicle top structure surrounding the opening,
    a plurality of compression springs attached to the bottom frame extending upwardly therefrom,
    a top frame attached to the compression springs urging the top and bottom frames apart, a roof attached directly to the top frame, a flexible wall attached to both the top frame and the bottom frame securing the frames together forming a sealed enclosed area, thus extending the vehicle top to allow head room within a vehicle interior, raising and lowering linkage means attached to both the top frame and the bottom frame such that the roof may be elevated or retracted by the raising and lowering linkage means, and electric drive means attached to the raising and lowering linkage means to raise or lower the roof.

14. An electric lift camper top configured to cover a vehicle having a rectangular head clearance opening in its top structure comprising:

vehicle top attaching means surrounding the opening, a roof positioned directly above a vehicle top attaching means, a flexible wall attached the roof and the vehicle top, forming an enclosed area, for extending the vehicle top structure upward to allow head room within a vehicle interior, raising and lowering linkage means directly coupled to both the roof and a bottom attaching means such that the roof may be elevated or retracted by the raising and lowering linkage means, and electric drive means attached to the raising and lowering linkage means to raise or lower the roof.

15. The electric lift camper top as recited in claim 14 wherein said electric drive means further comprise a double end drive electric motor, a pair of worm gears and a pair of shafts for electrically raising or lowering the roof.

16. The electric lift camper top as recited in claim 15 wherein said electric motor is a passenger vehicle seat adjuster motor operating on vehicle electrical power.

17. The electric lift camper top as recited in claim 15 further comprising, a plurality of compression springs disposed between the roof and the vehicle top attaching means urging the roof away from a vehicle top.

\* \* \* \* \*